US010801366B2

(12) United States Patent
Ganiger et al.

(10) Patent No.: US 10,801,366 B2
(45) Date of Patent: Oct. 13, 2020

(54) VARIABLE STIFFNESS BEARING HOUSING

(71) Applicant: General Electric Company, Schenectady, NY (US)

(72) Inventors: Ravindra Shankar Ganiger, Bangalore (IN); Prashant Mahadeo Bhujabal, Bangalore (IN); Milind Chandrakant Dhabade, Bangalore (IN)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 15/979,999

(22) Filed: May 15, 2018

(65) Prior Publication Data

US 2019/0353052 A1 Nov. 21, 2019

(51) Int. Cl.
*F01D 25/16* (2006.01)
*F16C 27/06* (2006.01)

(52) U.S. Cl.
CPC ............ *F01D 25/164* (2013.01); *F16C 27/06* (2013.01); *F05D 2220/32* (2013.01); *F05D 2240/50* (2013.01); *F05D 2300/505* (2013.01)

(58) Field of Classification Search
CPC ............ F16C 27/00–08; F16C 32/0677; F01D 25/164; F05D 2300/505
See application file for complete search history.

(56) References Cited

U.S. PATENT DOCUMENTS

| | | | | |
|---|---|---|---|---|
| 4,044,977 A * | 8/1977 | Feucht | ................. | F16C 27/063 267/141.3 |
| 4,496,252 A * | 1/1985 | Horler | ............... | C23C 16/45504 384/215 |
| 4,867,655 A * | 9/1989 | Barbic | ................ | F16F 15/0237 417/407 |
| 5,052,828 A | 10/1991 | Ciokajlo et al. | | |
| 5,205,652 A * | 4/1993 | Chapman | .............. | F01D 25/164 384/106 |
| 5,421,655 A * | 6/1995 | Ide | ......................... | F01D 25/164 384/99 |
| 5,531,522 A * | 7/1996 | Ide | ......................... | F01D 25/164 384/202 |
| 5,603,574 A * | 2/1997 | Ide | ......................... | F01D 25/164 384/117 |
| 5,658,125 A | 8/1997 | Burns et al. | | |
| 6,536,953 B1 * | 3/2003 | Cope | .................... | B65H 54/547 384/536 |

(Continued)

FOREIGN PATENT DOCUMENTS

JP 06200933 A * 7/1994 ............. F16C 27/04

*Primary Examiner* — Michael Lebentritt
*Assistant Examiner* — Topaz L. Elliott
(74) *Attorney, Agent, or Firm* — Dority & Manning, P.A.

(57) ABSTRACT

A turbine engine including a bearing element coupled to a rotor assembly and a bearing housing disposed substantially concentric to the axial centerline of the turbine engine. The bearing housing includes a first member coupled to the bearing element. The first member defines a groove at which a variable stiffness element is coupled to the first member and disposed within the groove. The bearing housing defines a first portion and a second portion adjacent to the first portion along a load direction. The first portion and the second portion together selectively define a gap therebetween based at least on a change in load along the load direction.

20 Claims, 3 Drawing Sheets (56) References Cited

U.S. PATENT DOCUMENTS

| | | | |
|---|---|---|---|
| 8,182,153 B2 * | 5/2012 | Singh | F01D 25/164 |
| | | | 384/477 |
| 8,662,756 B2 | 3/2014 | Care et al. | |
| 8,727,632 B2 | 5/2014 | Do et al. | |
| 9,121,305 B2 | 9/2015 | Nicholson | |
| 9,121,448 B2 | 9/2015 | Delgado Marquez et al. | |
| 9,297,310 B2 | 3/2016 | Giri et al. | |
| 9,447,817 B2 | 9/2016 | Gallimore et al. | |
| 9,476,320 B2 | 10/2016 | Savela | |
| 9,546,570 B2 | 1/2017 | Fletcher et al. | |
| 9,638,062 B2 | 5/2017 | Davis | |
| 9,644,541 B2 | 5/2017 | Morreale et al. | |
| 9,856,751 B2 | 1/2018 | Duong et al. | |
| 2010/0037462 A1 * | 2/2010 | Pettinato | F16C 27/02 |
| | | | 29/898.04 |
| 2010/0220948 A1 * | 9/2010 | Singh | F01D 25/164 |
| | | | 384/477 |
| 2013/0051982 A1 * | 2/2013 | Hindle | F01D 25/164 |
| | | | 415/119 |
| 2016/0097301 A1 * | 4/2016 | Rosenau | F01D 21/045 |
| | | | 415/119 |
| 2016/0341070 A1 | 11/2016 | Garcia et al. | |
| 2017/0030223 A1 | 2/2017 | Parry et al. | |
| 2017/0051629 A1 | 2/2017 | Sutherland | |
| 2017/0089220 A1 * | 3/2017 | Carter | F16C 27/045 |
| 2017/0089353 A1 | 3/2017 | Zhang et al. | |
| 2017/0145855 A1 | 5/2017 | Ganiger et al. | |
| 2017/0234158 A1 | 8/2017 | Savela | |
| 2017/0248191 A1 | 8/2017 | Husband et al. | |
| 2018/0245631 A1 * | 8/2018 | Nakayama | F01D 25/183 |
| 2018/0245632 A1 * | 8/2018 | Obara | F16C 19/06 |
| 2018/0298822 A1 * | 10/2018 | Ac | F16F 15/022 |

* cited by examiner

VARIABLE STIFFNESS BEARING HOUSING

FIELD

The present subject matter relates generally to variable stiffness static members for turbine engines.

BACKGROUND

Mechanical structures, including static casings surrounding rotary structures such as turbine engines, generally include structural members defining a single linear stiffness, or load versus deflection, for each load member. However, load changes or deflections may define a linear behavior based on operating conditions of the mechanical structure to which the structural member is defined. As such, known structural members may define limited ranges of operability relative to load or deflection behaviors of the mechanical structure to which the structural member is attached. Therefore, there is a need for improved stiffness properties for structural members for mechanical structures.

BRIEF DESCRIPTION

Aspects and advantages of the invention will be set forth in part in the following description, or may be obvious from the description, or may be learned through practice of the invention.

The present disclosure is directed to a turbine engine including a bearing element coupled to a rotor assembly and a bearing housing disposed substantially concentric to the axial centerline of the turbine engine. The bearing housing includes a first member coupled to the bearing element. The first member defines a groove at which a variable stiffness element is coupled to the first member and disposed within the groove. The bearing housing defines a first portion and a second portion adjacent to the first portion along a load direction. The first portion and the second portion together selectively define a gap therebetween based at least on a change in load along the load direction.

In various embodiments, the variable stiffness element includes a shape memory alloy. In still various embodiments, the variable stiffness element includes the shape memory alloy defining a two-way memory effect. In one embodiment, the variable stiffness element defines a first stiffness at a load corresponding to zero revolutions per minute (RPM) to an idle operating condition of the turbine engine. In another embodiment, the bearing housing defines an overall stiffness based at least on a sum of stiffness from the variable stiffness element and the first member. The overall stiffness substantially corresponds to a first member stiffness from zero RPM to the idle operating condition of the turbine engine. In yet another embodiment, the variable stiffness element defines the first stiffness less than a first member stiffness at a load corresponding to zero RPM to the idle operating condition of the turbine engine.

In still various embodiments, the variable stiffness element defines a second stiffness at a load corresponding from an idle operating condition to a maximum normal load operating condition of the turbine engine. In one embodiment, the bearing housing defines an overall stiffness based at least on a sum of stiffness from the variable stiffness element and the first member. The overall stiffness substantially corresponds to a sum of a first member stiffness and the second stiffness of the variable stiffness element. In another embodiment, the gap is equal to zero when the turbine engine defines an abnormal load operating condition.

In still another embodiment, the variable stiffness element defines the second stiffness greater than a first member stiffness at a load corresponding from the idle operating condition to the maximum normal load operating condition of the turbine engine.

In various embodiments, the variable stiffness element defines a spring. In one embodiment, the variable stiffness element defines a hat spring, a wave spring, a helical spring, a corrugated sheet, a spring finger, or combinations thereof.

In still various embodiments, the engine further includes a fluid supply conduit providing a flow of fluid in thermal communication with the variable stiffness element. In one embodiment, the bearing housing defines an opening in fluid communication with the fluid supply conduit through which the flow of fluid is provided in thermal communication with the variable stiffness element. In various embodiments, the engine further includes a controller modulating thermal communication of the flow of fluid with the variable stiffness element based on an engine operating condition. In one embodiment, the controller adjusts thermal energy at the variable stiffness element in direct relationship to the engine operating condition of the turbine engine.

In one embodiment, the first member defines a vertical portion coupled to a horizontal portion to define the groove.

In another embodiment, the rotor assembly defines a high speed rotor assembly of the turbine engine.

In still another embodiment, the bearing housing is disposed aft of a combustion section of the turbine engine.

In still yet another embodiment, the gap is variable between approximately 0.040 millimeters and zero millimeters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of turbine engines including a bearing housing shown and described herein may provide improved stiffness properties for the engine in response to changes in loading based at least on an operational parameter or engine condition. The embodiments of the bearing housing generally shown and described herein include gaps between two or more portions of the bearing housing to selectively close or open based on changes in thermal or centrifugal loading from a rotor assembly as engine operating conditions change. As the gap closes or opens, the bearing housing defines two or more stiffness versus operational parameter slopes such as to improve the stiffness properties of the bearing housing relative to the rotor assembly. Such improved stiffness properties may improve engine operation defining a bowed rotor condition, mitigate deleterious effects of rotor unbalance, tighten clearances, or improve engine start times (e.g., turnaround times), thereby improving engine efficiency.

Figure 1:
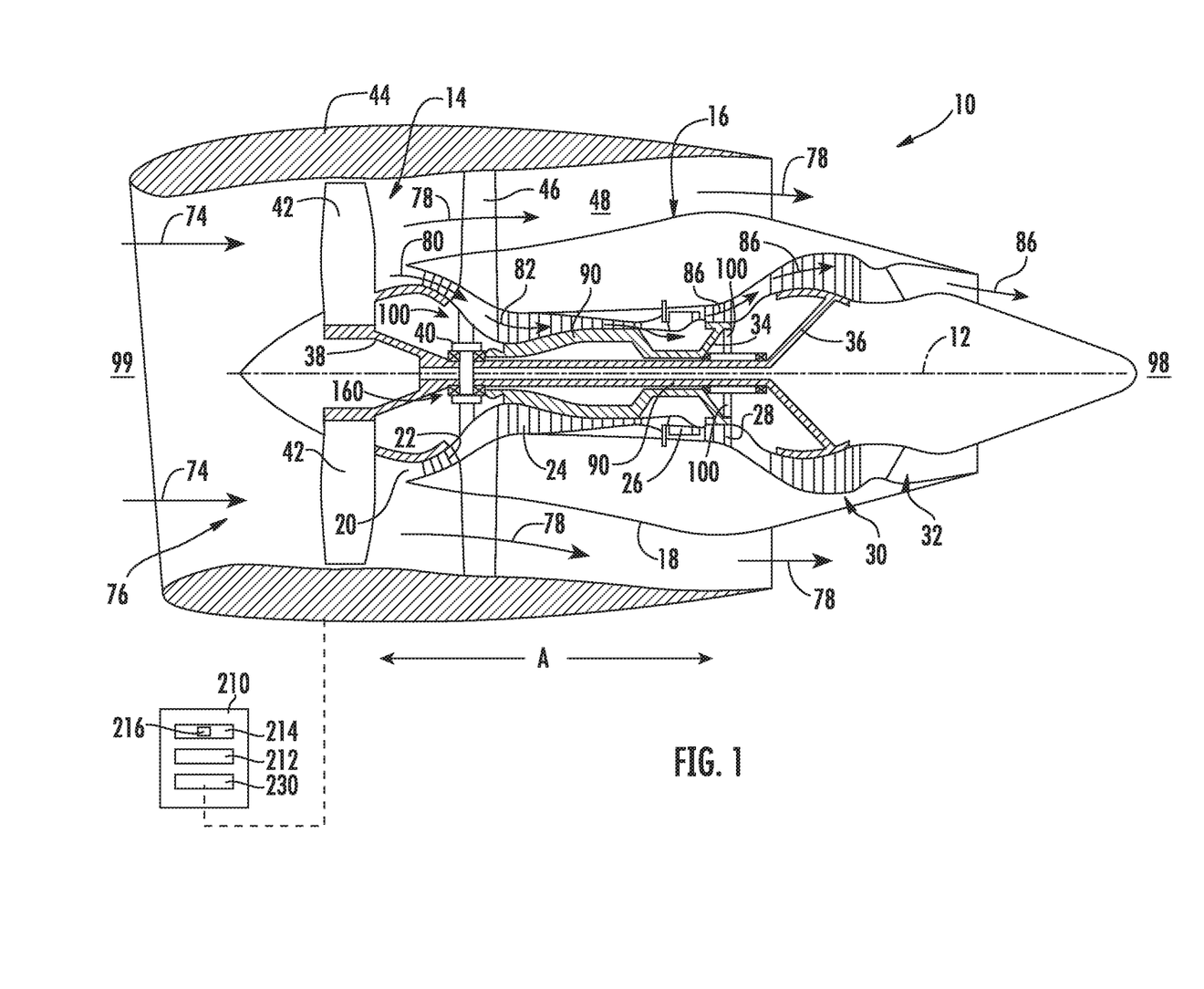
FIG. 1 is an exemplary embodiment of a turbine engine including a bearing housing according to an aspect of the present disclosure.

Referring now to the drawings, FIG. 1 is a schematic partially cross-sectioned side view of an exemplary gas turbine engine 10 herein referred to as "engine 10" as may incorporate various embodiments of the present invention. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

It should be appreciated that combinations of the shaft 34, 36, the compressors 22, 24, and the turbines 28, 30 define a rotor assembly 90 of the engine 10. For example, the HP shaft 34, HP compressor 24, and HP turbine 28 may define a high speed or HP rotor assembly of the engine 10. Similarly, combinations of the LP shaft 36, LP compressor 22, and LP turbine 30 may define a low speed or LP rotor assembly of the engine 10. Various embodiments of the engine 10 may further include the fan shaft 38 and fan blades 42 as the LP rotor assembly. In other embodiments, the engine 10 may further define a fan rotor assembly at least partially mechanically de-coupled from the LP spool via the fan shaft 38 and the reduction gear 40. Still further embodiments may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrows 80, enters the core engine 16 through a core inlet 20 defined at least partially via the outer casing 18. The flow of air 80 is increasingly compressed as it flows across successive stages of the compressors 22, 24, such as shown schematically by arrows 82. The compressed air 82 enters the combustion section 26 and mixes with a liquid or gaseous fuel and is ignited to produce combustion gases 86. The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the bypass airflow passage 48, such as shown schematically by arrows 78.

The engine 10 further includes a plurality of bearing housings 100 disposed at the rotor assemblies 90 of the engine 10. The bearing housings 100 each support rotation of the rotor assembly 90. Embodiments of the bearing housing 100 may generally include inner and outer casings and manifolds or conduits to supply and scavenge lubricant. The conduits provide and extract a flow of lubricant and/or damper or buffer fluid to and from one or more bearing elements 160 within the bearing housing 100. The bearing elements 160 are further coupled to one or more rotor assemblies 90 and directly or indirectly to the bearing housing 100. The bearing housing 100 may further include a damper assembly (not shown) providing a flow of air or other fluid to dampen or limit vibrations, oscillations, or unbalance from the rotor assembly 90 during operation of the engine 10. The bearing housing 100 and bearing element 160 generally requires a lubricant, such as oil, to enable rotation of the rotor assembly, reduce heat or thermal accumulation at the bearing housing 100 and/or bearing element 160, and provide damping of vibrations from rotation of the rotor assembly 90.

Referring now to FIGS. 2-7, exemplary embodiments of the bearing housing 100 are generally provided. The bearing housing 100 is disposed substantially concentric to the axial centerline 12 of the turbine engine 10. The bearing housing 100 includes a first member 110 coupled to the bearing element 160. The first member 110 defines a groove 115 at which a variable stiffness element 120 is coupled to the first member 110. The variable stiffness element 120 is further disposed within the groove 115. The first member 110 further defines a first portion 111 and a second portion 112 adjacent to the first portion 111 along a load direction 91. The first portion 111 and the second portion 112 together selectively define a gap 140 therebetween based at least on a change in load along the load direction 91.

Changes in load along the load direction 91 are reacted to via changes to the stiffness of the variable stiffness element 120 and further whether the gap 140 is closed or open. Additionally, or alternatively, as the variable stiffness element 120 defining a plurality of stiffnesses reacts to increased thermal or centrifugal loading corresponding to increased rotor assembly 90 rotational speed and thrust generation of the engine 10, the gap 140 decreases to zero at a desired speed, temperature, or thrust threshold of the engine 10.

In various embodiments, the first member 110 defines a vertical portion 116 coupled to a horizontal portion 117 to define the groove 115. The first member 110 may generally define a hairpin-type structure, such as a spring. For example, the vertical portion 116 and the horizontal portion 117 may together define the first member 110 as a hairpin-type structure or spring. As another example, the vertical portion 116 and the horizontal portion 117 may together generally define a "C" or "U" cross section. The groove 115 may generally be defined between adjacent spaced-apart horizontal portions 117 or vertical portions 116. The first member 110 defining a hairpin-type or spring structure may enable deflection along the load direction 91 based on changes in loading (e.g., changes in engine operating condition or thrust output, changes in temperature, etc.). As such, the first member 110 defining a hairpin-type or spring structure may deflect along the load direction 91 such as to selectively increase or decrease the gap 140 based on changes in loading, such as based on changes in the operational parameter of the engine 10.

Figure 2:
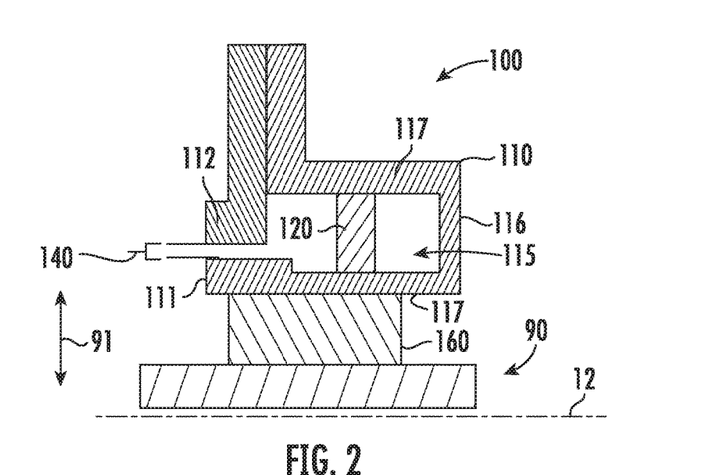
FIGS. 2-7 are exemplary embodiments of the bearing housing according to aspects of the present disclosure.
Figure 3:
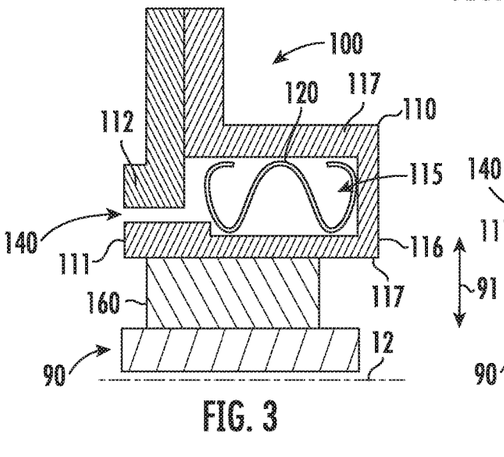
Figure 4:
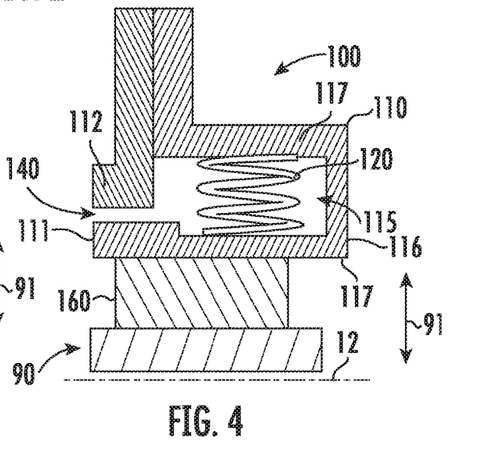
Figure 5:
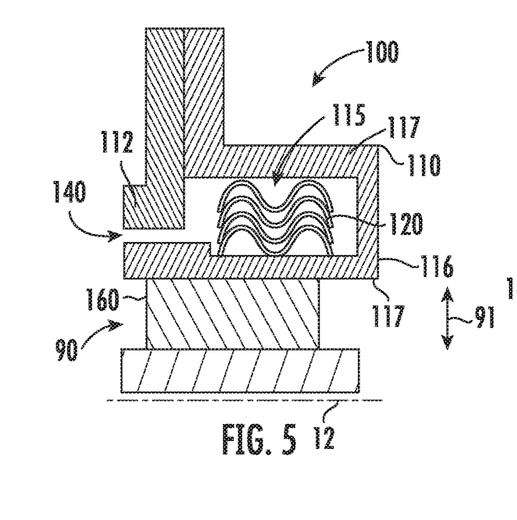

Operation of the engine 10 shown and described in regard to FIGS. 1-2 generates thermal and centrifugal loads from the rotor assembly 90 that vary as a function of the operational parameters or operating conditions of the engine 10. For example, as the rotor assembly 90 increases in rotational speed, the engine 10 produces increasing magnitudes of thrust. The increasing magnitudes of thrust correspond to the increasing loads along the load direction 91. As another example, increasing rotational speeds of the rotor assembly 90 substantially corresponding to increasing thrust loads and increasing temperatures cause the gap 140 to decrease toward zero due to the different variable stiffness element 120 within the groove 115 of the first member 110. As such, the operational parameters may generally include one or more of a thrust output of the engine 10, a temperature one or more of the bearing housing 100 including the first member 110, or a rotational speed of the rotor assembly 90, or combinations thereof.

In various embodiments, the gap 140 defines a nominal or zero load gap of approximately 0.040 millimeters. However, it should be appreciated that the gap 140 is defined based on a configuration of the engine 10. As such, the nominal or zero load gap condition may be greater or lesser. The variable stiffness element 120 may enable the selective opening and closing of the gap 140 corresponding to the operational parameters or engine condition and a desired stiffness of the bearing housing 100 relative to the rotor assembly 90. As another example, at relatively low power conditions (e.g., startup and ignition, idle conditions, etc.), the presence of the gap 140 enables a lower transfer of loads along the load direction 91. In contrast, at high power conditions (e.g., full load condition, takeoff, etc.) the gap 140 is zero such as to enable full load transfer along the load direction 91. Such selective change in load condition at the bearing housing 100 may further provide sufficient stiffness at various conditions while enabling adaptive response (e.g., lower vibratory responses) at low power conditions when the engine 10 defines a bowed rotor condition at the rotor assembly 90 (i.e., eccentricity of the rotor assembly 90 relative to the axial centerline 12 due to asymmetric circumferential and/or radial thermal gradients).

In various embodiments, the variable stiffness element 120 includes a shape memory alloy. For example, the variable stiffness element 120 generally includes a material configured to define a first shape based on a first operational parameter and a second shape (different from the first shape) based on a second operational parameter different from the first operational parameter. The shape memory alloy generally returns to and from the first shape and the second shape as the operational parameter changes. As such, in one embodiment, the variable stiffness element 120 includes the shape memory alloy defining a two-way memory effect. In still various embodiments, the variable stiffness element 120 includes, but is not limited to, nickel, titanium, zinc, copper, gold, or iron, or combinations thereof.

In still various embodiments, the variable stiffness element 120 defines a first stiffness at a load corresponding to zero revolutions per minute (RPM) to an idle operating condition of the turbine engine. For example, from rest or substantially zero rotation of the rotor assembly 90 of the engine 10 to an idle operating condition (e.g., a lowest steady-state speed of the engine 10 based at least on an environmental condition), the variable stiffness element 120 defines a first stiffness. The first stiffness of the variable stiffness element 120 at or under the idle operating condition is less than a first member stiffness of the first member 110 of the bearing housing 100.

In one embodiment, the bearing housing 100 defines an overall stiffness substantially corresponding to the first member stiffness of the first member 110 when the engine 10 is at or under the idle operating conditions. For example, the bearing housing 100 defines the overall stiffness based at least on a sum of first stiffness from the variable stiffness element 120 and the first member stiffness from the first member 110. The overall stiffness of the bearing housing 100 substantially corresponds to the first member stiffness of the first member 110 when the engine 10 defines an operating condition from zero RPM to the idle operating condition. In still various embodiments, the gap 140 is greater than zero at or under the idle operation condition.

In still yet various embodiments, the variable stiffness element 120 defines a second stiffness at a load corresponding from the idle operating condition to a maximum normal load operating condition of the engine 10. For example, the maximum normal load operating condition may define a full load condition or takeoff condition of the engine 10. As another example, the maximum normal load operating condition may define a maximum rotational speed of the rotor assembly 90. As still another example, the maximum normal load operating condition may define a maximum rotational speed of the rotor assembly 90 and further a maximum exhaust gas temperature from the engine 10.

In one embodiment, the bearing housing 100 defines an overall stiffness substantially corresponding to a sum of the second stiffness of the variable stiffness element 120 and the first member stiffness of the first member 110. In such an embodiment, the variable stiffness element 120 defines the second stiffness greater than the first member stiffness of the first member 110 at a load corresponding from the idle operating condition to the maximum normal load operating condition of the engine 10. In still another embodiment, the gap 140 is equal to zero when the engine 10 defines the maximum normal load operating condition.

In other embodiments, the gap 140 is equal to zero when the engine 10 further defines an abnormal load operating condition. For example, the abnormal load operating condition generally includes one or more of a high vibration condition of the engine 10, including, but not limited to, one or more conditions resulting from relatively high unbalance of the rotor assembly 90, or high eccentricity condition of the rotor assembly 90 relative to the surrounding casings, such as including the bearing housing 100. As another example, the abnormal load operating condition is based on one or more of a blade liberation event (e.g., loss or detachment of all or part of a rotating airfoil of the rotor assembly 90, including, but not limited to, one or more of the fan blades 42), or a blade impact event, such as, but not limited to, domestic or foreign object debris damage. Such domestic or foreign object debris damage may include, but is not limited to, bird strikes, hail ingestion, dirt and earth, and engine component breakage or liberation.

Referring still to FIGS. 2-7, the variable stiffness element 120 may generally define a spring. For example, the variable stiffness element 120 defining a spring may further define one or more of a hat spring (FIG. 3), a wave spring or helical spring (FIG. 4), one or more corrugated sheets (FIG. 5), a spring finger (FIG. 6), or combinations thereof. It should further be appreciated that other suitable spring configurations may be utilized. In still further examples, the variable stiffness element 120 defining a spring may further define a shape memory alloy such as described above.

Various embodiments of the bearing housing 100 including the variable stiffness element 120 defining a spring may further dispose the spring adjacent to or otherwise in contact with the first member 110 within the groove 115 defined in the bearing housing 100. For example, the variable stiffness element 120 defining a spring may contact adjacent spaced-apart horizontal portions 117 of the first member 110. As another example, the variable stiffness element 120 may further be coupled to or contacting the vertical portion 116 of the first member 110.

Figure 6:
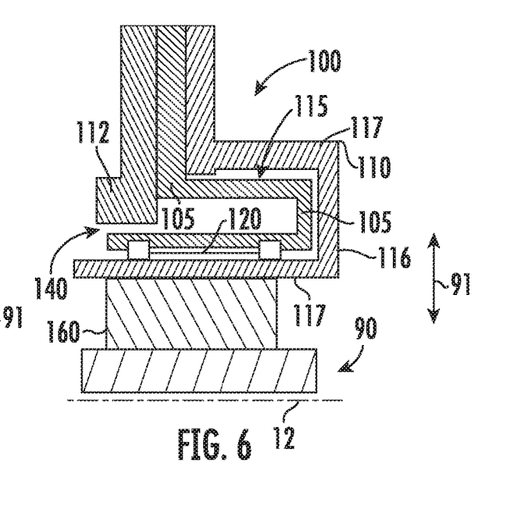

Referring now to FIG. 6, in various embodiments, the bearing housing 100 may further include a viscous material 105 disposed within the groove 115 of the first member 110. The viscous material 105 may generally be coupled to the variable stiffness element 120. In various embodiments, the viscous material 105 further defines a viscoelastic material. The viscous material 105 may further provide or improve damping of the bearing housing 100 or the engine 10 (FIG. 1) to which the bearing housing 100 is coupled. For example, the viscous material 105 may at least partially isolate vibration, dampen noise or resonance, or reduce shock due to loads, or changes in loads, or frequency of changes in loads, applied to the bearing housing 100 or the surrounding engine 10 (FIG. 1). Various embodiments of the viscous material 105 may define a gel or foam applied at least partially within the groove 115. As another example, the bearing housing 100 may further be defined within an enclosed cavity or vessel containing a viscous fluid, such that the viscous fluid may ingress to the groove 115 such as to define the viscous material 105.

Figure 7:
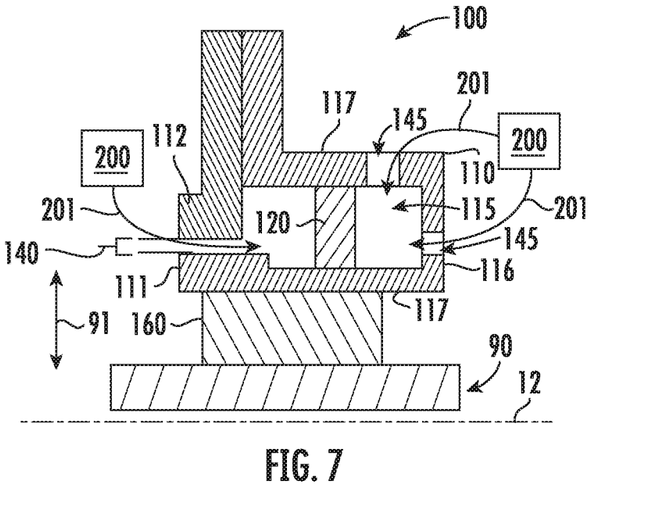

Referring now to FIG. 7, the engine 10 generally provided in FIG. 1 may further a fluid supply conduit 200 providing a flow of fluid, shown schematically by arrows 201, in thermal communication with the variable stiffness element 120. The fluid supply conduit 200 may generally define a fluid supply manifold or conduit, such as, but not limited to, a lubricant supply and/or scavenge system, a damper fluid supply system, a compressor bleed fluid system, or other suitable fluid supply system. In various embodiments, the fluid 201 may define a flow of air, lubricant, or coolant, or another suitable fluid to provide or remove thermal energy from the variable stiffness element 120. For example, the fluid 201 may include damper air such as to attenuate undesired vibrations. As another example, the fluid 201 may include a lubricant provided generally to the bearing assembly including the bearing housing 100 and the bearing element 160. The fluid 201 may be provided or restricted, or a temperature of the fluid 201 may be adjusted, based at least on a desired stiffness of the bearing housing 100, or more specifically, the variable stiffness element 120. Such as described above, the desired stiffness of the bearing housing 100 may be based on one or more operational parameters or engine conditions.

Referring still to FIG. 7, the bearing housing 100 may define an opening 145 in fluid communication with the fluid supply conduit 200 through which the flow of fluid 201 is provided in thermal communication with the variable stiffness element 120. In one embodiment, the opening 145 is defined through the first member 110 such as to enable fluid communication of the fluid 201 with the variable stiffness element 120. For example, the opening 145 may be defined through one or more of the horizontal portion 117 and/or the vertical portion 116 of the first member 110. As another example, the opening 145 may be defined at the gap 140.

Referring back to FIG. 1, the engine 10 may further include a controller 210. In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., adjusting or modulating a temperature at the variable stiffness element 120 via the flow, pressure, and/or temperature of fluid 201 in thermal communication therewith).

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as to adjust or vary the stiffness of the bearing housing 100, such as via the variable stiffness element 120, such as shown and described herein. In addition, the control logic 216 can include an embodiment of the graph 500 (FIG. 8), such as further described below. In various embodiments, the graph 500 may define a table, curve, or function that may be referenced when executing one or more steps of the method 1000.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the rotor assembly 90, the bearing housing 100, the bearing element 160, or sensors proximate or attached thereto providing an operational parameter, such as thrust output, surface or fluid temperature, rotational speed, vibration or acceleration, pressure, or flow rate. In addition, the communications interface module 230 can also be used to communicate with any other suitable components of the engine 10, including any number of sensors configured to monitor one or more operating parameters of the engine 10. It should be appreciated that the communications interface module 230 can be any combination of suitable wired and/or wireless communications interfaces and, thus, can be communicatively coupled to one or more components of the engine 10 via a wired and/or wireless connection. As such, the controller 210 may modulate thermal communication, such as the temperature of the variable stiffness element 120, the first member 110, or combinations thereof, such as via the flow of fluid 201 from the fluid supply conduit 200.

The controller 210 may generally modulate thermal communication of the flow of fluid 201 with the variable stiffness element 120 based at least on an operational parameter or engine operating condition. Still further, the controller 210 may adjust thermal energy at the variable stiffness element 120 in direct relationship to the operational parameter or engine operating condition (e.g., increase temperature with increases in the operational parameter, decrease temperature with decreases in the operational parameter, etc.).

Figure 8:
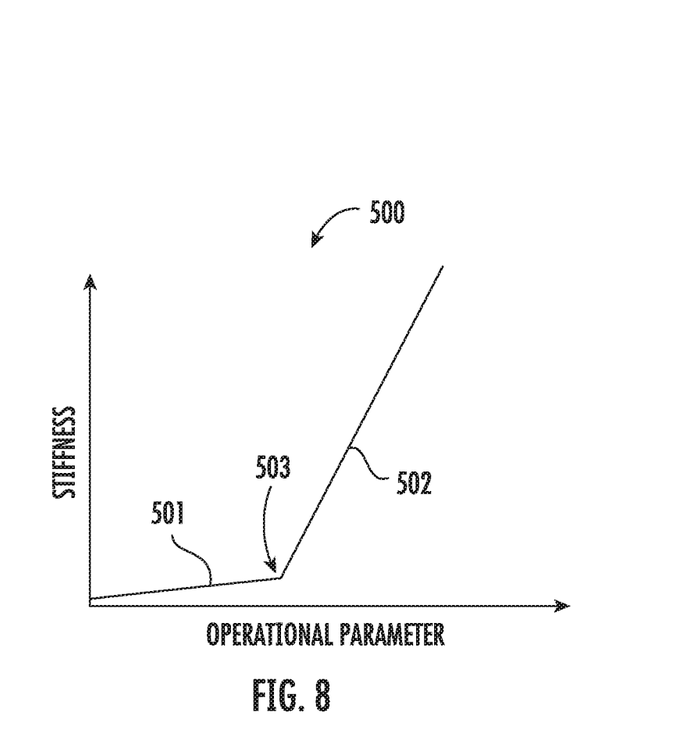
FIG. 8 is a graph depicting changes in stiffness of the bearing housing relative to a rotor assembly as a function of an operating parameter of the engine generally provided in regard to FIG. 1.

Referring now to FIG. 8, an exemplary graph 500 depicting an exemplary relationship between an operational parameter of the engine 10 and the variable stiffness of the static support structure 100 is generally provided. In various embodiments, the operational parameter may generally include one or more of a thrust output of the engine 10, a temperature one or more of the first member 110 and/or the variable stiffness element 120, or a rotational speed of the rotor assembly 90, or combinations thereof. As stiffness is the slope of load (e.g., the thermal or centrifugal load applied along the load direction 91) versus deflection (e.g., corresponding to changes in the gap 140 along the load direction 91), as loads increase with the increasing operational parameter the graph 500 depicts a first slope 501 of the stiffness of the bearing housing 100 versus the operational parameter. At the desired threshold corresponding to the operational parameter, such as depicted at 503, the graph 500 depicts a second slope 502 of the stiffness versus the operational parameter. The threshold 503 corresponds substantially to the gap 140 closing to zero. For example, the threshold 503 corresponds substantially to the first portion 111 contacting the second portion 112 of the first member 110 when the gap 140 closes to zero. Similarly, when the operational parameter decreases below the threshold 503, the gap 140 opens to greater than zero and the bearing housing 100 relative to the rotor assembly 90 defines the first slope 501.

In various embodiments, the desired threshold corresponds to a rotational speed or surface temperature of the rotor assembly 90 or thrust output of the engine 10 corresponding to an operating condition greater than a low power or ground idle condition. In still various embodiments, the desired threshold corresponds to a rotational speed or surface temperature of the rotor assembly 90 or thrust output of the engine 10 corresponding to an operating condition at or greater than a mid-power or cruise condition. In still yet various embodiments, the desired threshold corresponds to a rotational speed or surface temperature of the rotor assembly 90 or thrust output of the engine 10 corresponding to an operating condition at a high power or takeoff condition.

It should be appreciated that in various embodiments, the increasing and decreasing operational parameter may correspond to accelerations or decelerations of the rotor assembly 90. In still various embodiments, the operational parameter may include one or more other parameters substantially directly related to changes in rotational speed of the rotor assembly 90 or thermal or centrifugal loads generated from the rotor assembly 90. In still another embodiment, the threshold 503 may further correspond to a desired operational parameter relative to mitigating an undesired vibratory mode or condition. For example, the undesired vibratory mode may correspond to a bowed rotor condition and mitigating deleterious effects of accelerating the rotor assembly 90 defining the bowed rotor condition.

Various embodiments of the bearing housing 100 including the variable stiffness element 120 may be disposed at one or more bearing assembly locations at the engine 10. For example, the bearing housing 100 may be coupled to a LP rotor assembly, a HP rotor assembly, or one or more intermediate pressure or speed rotor assemblies. As another example, the bearing housing 100 may be coupled to an aft portion of the engine 10, such as at or aft of the combustion section 26.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine engine defining an axial centerline, the engine comprising:
   a bearing element coupled to a rotor assembly;
   a bearing housing disposed substantially concentric to the axial centerline of the turbine engine;

a fluid supply conduit; and
a controller,
wherein the bearing housing comprises a first member coupled to the bearing element,
wherein the first member defines a groove at which a variable stiffness element is coupled to the first member and disposed within the groove,
wherein the bearing housing defines a first portion and a second portion adjacent to the first portion along a load direction,
wherein the first portion and the second portion together selectively define a gap therebetween based at least on a change in load along the load direction,
wherein the fluid supply conduit provides a flow of fluid in thermal communication with the variable stiffness element, and
wherein the controller modulates thermal communication of the flow of fluid with the variable stiffness element based on an engine operating condition.

2. The turbine engine of claim 1, wherein the variable stiffness element comprises a shape memory alloy.

3. The turbine engine of claim 2, wherein the variable stiffness element comprises the shape memory alloy defining a two-way memory effect.

4. The turbine engine of claim 3, wherein the variable stiffness element defines a first stiffness at loads corresponding to between zero revolutions per minute (RPM) and an idle operating condition of the turbine engine.

5. The turbine engine of claim 4, wherein the variable stiffness element defines the first stiffness less than a first member stiffness at loads corresponding to between zero RPM and the idle operating condition of the turbine engine.

6. The turbine engine of claim 3, wherein the variable stiffness element defines a second stiffness at loads corresponding to between an idle operating condition and a maximum normal load operating condition of the turbine engine.

7. The turbine engine of claim 1, wherein the variable stiffness element comprises a spring.

8. The turbine engine of claim 7, wherein the variable stiffness element comprises a hat spring, a wave spring, a helical spring, a corrugated sheet, a spring finger, or combinations thereof.

9. The turbine engine of claim 1, wherein the first member defines a vertical portion coupled to a horizontal portion to define the groove.

10. The turbine engine of claim 1, wherein the rotor assembly defines a high speed rotor assembly of the turbine engine.

11. The turbine engine of claim 1, wherein the bearing housing is disposed aft of a combustion section of the turbine engine.

12. The turbine engine of claim 1, wherein the gap is variable between approximately 0.040 millimeters and zero millimeters.

13. A turbine engine defining an axial centerline, the engine comprising:
a bearing element coupled to a rotor assembly; and
a bearing housing disposed substantially concentric to the axial centerline of the turbine engine;
wherein the bearing housing comprises a first member coupled to the bearing element,
wherein the first member defines a groove at which a variable stiffness element is coupled to the first member and disposed within the groove,
wherein the bearing housing defines a first portion and a second portion adjacent to the first portion along a load direction,
wherein the first portion and the second portion together selectively define a gap therebetween based at least on a change in load along the load direction,
wherein the variable stiffness element comprises a shape memory alloy,
wherein the variable stiffness element comprises the shape memory alloy defining a two-way memory effect,
wherein the variable stiffness element defines a first stiffness at loads corresponding to between zero revolutions per minute (RPM) and an idle operating condition of the turbine engine,
wherein the bearing housing defines an overall stiffness based at least on a sum of stiffness from the variable stiffness element and the first member, and
wherein the overall stiffness substantially corresponds to a first member stiffness from zero RPM to the idle operating condition of the turbine engine.

14. The turbine engine of claim 13, further comprising:
a fluid supply conduit providing a flow of fluid in thermal communication with the variable stiffness element.

15. The turbine engine of claim 14, wherein the bearing housing defines an opening in fluid communication with the fluid supply conduit through which the flow of fluid is provided in thermal communication with the variable stiffness element.

16. The turbine engine of claim 14, further comprising:
a controller, wherein the controller modulates thermal communication of the flow of fluid with the variable stiffness element based on an engine operating condition.

17. The turbine engine of claim 16, wherein the controller adjusts thermal energy at the variable stiffness element in direct relationship to the engine operating condition of the turbine engine.

18. A turbine engine defining an axial centerline, the engine comprising:
a bearing element coupled to a rotor assembly; and
a bearing housing disposed substantially concentric to the axial centerline of the turbine engine;
wherein the bearing housing comprises a first member coupled to the bearing element,
wherein the first member defines a groove at which a variable stiffness element is coupled to the first member and disposed within the groove,
wherein the bearing housing defines a first portion and a second portion adjacent to the first portion along a load direction,
wherein the first portion and the second portion together selectively define a gap therebetween based at least on a change in load along the load direction,
wherein the variable stiffness element comprises a shape memory alloy,
wherein the variable stiffness element comprises the shape memory alloy defining a two-way memory effect,
wherein the variable stiffness element defines a second stiffness at loads corresponding to between an idle operating condition and a maximum normal load operating condition of the turbine engine,
wherein the bearing housing defines an overall stiffness based at least on a sum of stiffness from the variable stiffness element and the first member, and wherein the overall stiffness substantially corresponds to a sum of a first member stiffness and the second stiffness of the variable stiffness element.

19. The turbine engine of claim 18, wherein the gap is equal to zero when the turbine engine defines an abnormal load operating condition.

20. The turbine engine of claim 18, wherein the variable stiffness element defines the second stiffness greater than the first member stiffness at loads corresponding to between the idle operating condition and the maximum normal load operating condition of the turbine engine.

* * * * *